(No Model.)
I. WAGNER.
ATTACHMENT FOR LAWN MOWERS.
No. 422,473.  Patented Mar. 4, 1890.
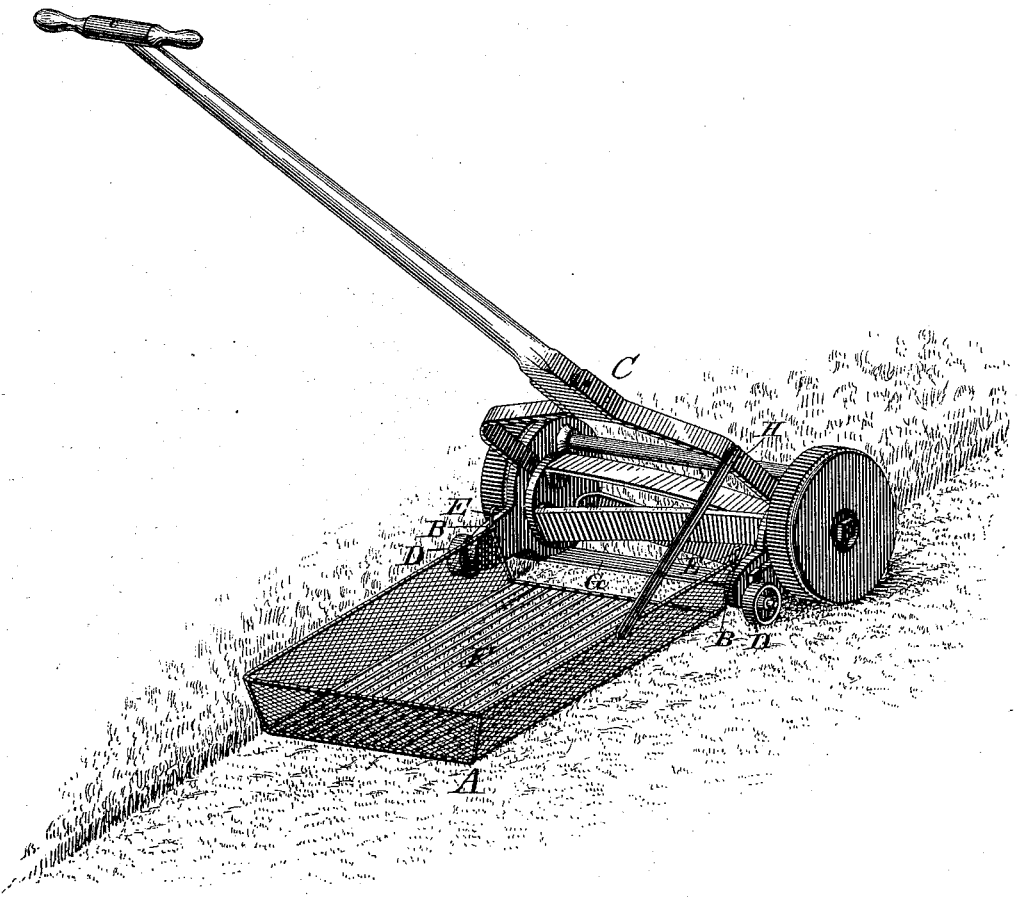
Witnesses
Inventor.
Ira Wagner
By Taylor & Hay
Attys.

UNITED STATES PATENT OFFICE.

IRA WAGNER, OF NEW CASTLE, PENNSYLVANIA.

ATTACHMENT FOR LAWN-MOWERS.

SPECIFICATION forming part of Letters Patent No. 422,473, dated March 4, 1890.

Application filed September 9, 1889. Serial No. 323,406. (No model.)

*To all whom it may concern:*

Be it known that I, IRA WAGNER, a citizen of the United States of America, residing at New Castle, in the county of Lawrence and State of Pennsylvania, have invented certain new and useful Improvements in Attachments for Lawn-Mowers, of which the following is a specification, reference being had therein to the accompanying drawing.
My invention relates to grass receptacles or gatherers for lawn-mowers; and it consists in certain improvements in construction, hereinafter described and claimed.

The accompanying drawing shows a perspective view of the gatherer in position upon the mower.

C represents a lawn-mower of the usual construction, the rear of which is supported by two small rollers D, each turning upon an axle on the outer side of the side plates of the mower and mounted in adjustable bearings in the ordinary manner.

A represents the gatherer, the frame of which is formed by wires of suitable size bent to proper shape and fastened together. The top wire on each side is twisted at or near the front to form the eyes B, adapted to be engaged by suitable hooks or pins E upon the rear of the side plates of the mower, so as to hold the front end of the gatherer against the cutter-bar G of the mower, thereby lifting the front end from the ground and forming a fulcrum by which the rear end of the gatherer may be lifted from the ground when turning the machine around. The front of the gatherer is open and wire-netting is attached to the frame to form the sides and back; or other material—such as tin, sheet iron, or wood—may be used. The top may be covered or left open, as desired. The bottom of the gatherer is formed by the parallel wire rods F, running lengthwise about three-eighths of an inch apart, and securely attached to the frame of the gatherer.
If desired, the gatherer may be connected with the handle of the mower by means of the arm H, having one end pivoted to the side of the gatherer and the other end pivoted to the handle of the mower, so that by raising the handle the gatherer will be lifted from the ground. Where the arm H is to be used in the construction, the gatherer may be attached to the mower in such manner as to leave an open space beween the front end of the gatherer and the cutter-bar of the mower, as shown in the drawing; but where the arm is omitted the gatherer must rest against the cutter-bar.

It will be seen that when the mower is operated the cut grass will be thrown into the gatherer A upon the parallel rods F, forming the bottom, and the stubble projecting up between these rods will hold the grass until the back of the gatherer comes and takes it along.

Heretofore grass-receptacles for lawn-mowers have been made with solid bottoms, or bottoms formed of wire-netting, rendering it necessary for the operator to frequently stop and shove the cut grass to the back of the gatherer in order to make room for more; but with my improved device the cut grass will accumulate at the rear of the gatherer, and no attention need be given to the latter until it is full, when it can be instantly detached and emptied.

Having thus described my invention, what I claim as new, and desire to secure by Letters Patent, is—

1. The combination, with a lawn-mower having small wheels D and pins E, of the arm H and gatherer having eyes B and bottom formed by parallel rods F, as and for the purposes described.

2. The combination, with a lawn-mower having small wheels D and pins E, of the gatherer having eyes B and bottom formed by parallel rods F, as and for the purposes described.

3. The combination, with a lawn-mower, of a grass-gatherer having its bottom formed by parallel rods, as and for the purposes described.

In testimony whereof I affix my signature in presence of two witnesses.

IRA WAGNER.

Witnesses:
SAM J. TAGGART,
J. L. MCCLELLAND.